(12) United States Patent
Tucker et al.

(10) Patent No.: US 6,940,594 B2
(45) Date of Patent: Sep. 6, 2005

(54) MEASUREMENT OF POLARIZATION-RESOLVED OPTICAL SCATTERING PARAMETERS

(75) Inventors: Rodney S. Tucker, Hawthorn (AU); Douglas Michael Baney, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 475 days.

(21) Appl. No.: 10/174,772

(22) Filed: Jun. 18, 2002

(65) Prior Publication Data

US 2003/0231310 A1 Dec. 18, 2003

(51) Int. Cl.[7] .................................................. G01J 4/00
(52) U.S. Cl. ....................... 356/364; 398/65; 398/152; 359/483; 702/106
(58) Field of Search ............................... 356/337–343, 356/369–370, 364, 73.1; 398/65, 152, 184, 205; 359/483; 250/341.3, 559.09; 702/40, 106

(56) References Cited

U.S. PATENT DOCUMENTS 5,293,210 A * 3/1994 Berndt ........................ 356/39

6,301,037 B1 * 10/2001 Fischer et al. .............. 398/201

OTHER PUBLICATIONS

Walker, N.C.; Carroll, J.E., Simultaneous Phase and Amplitude Measurements on Optical Signals Using a Multiport Juction, Electronics Letters, Nov. 8, 1984, vol. 20, No. 23, p. 981–983.*

* cited by examiner

Primary Examiner—Gregory J. Toatley, Jr.
Assistant Examiner—Roy M. Punnoose

(57) ABSTRACT

Method and apparatus for determining scattering parameters of a scattering matrix of an optical device. A method according to the present invention comprises applying an optical stimulus to a plurality of ports of the optical device, measuring optical fields emerging from the plurality of ports in amplitude and phase, and calculating the scattering parameters using the measured optical fields. The applying step includes applying the optical stimulus to the plurality of ports simultaneously. The method ensures a consistent phase reference for measurement of all of the scattering parameters so that all measurable characteristics of the device can be calculated directly from the scattering parameters.

14 Claims, 2 Drawing Sheets

MEASUREMENT OF POLARIZATION-RESOLVED OPTICAL SCATTERING PARAMETERS

BACKGROUND OF THE INVENTION

1. Technical Field of the Invention

The present invention relates generally to the optical measurement field. More particularly, the invention relates to a method and apparatus for determining scattering parameters of a polarization-resolved scattering matrix of an optical device.

2. Description of Related Art

Coherent frequency-swept heterodyne network analysis is a known technique for measuring characteristics of optical devices. For example, characteristics such as group delay, loss and polarization-dependent loss (PDL) can all be obtained using heterodyne network analysis. It is also known that the polarization-resolved scattering parameters provide the most general and complete characterization of an optical device. In particular, once the full polarization-resolved scattering parameters of an optical device have been determined, all other measurable device parameters, such as group delay, PDL and the like can be readily calculated.

There is a need for a technique for determining the polarization-resolved scattering matrix of an optical device that ensures a consistent phase reference for all measurements to determine the scattering parameters of the matrix. By providing a consistent phase reference for all measurements, all measurable parameters of an optical device can be calculated directly from the scattering parameters.

SUMMARY OF THE INVENTION

Embodiments in accordance with the invention provide a method and apparatus for determining scattering parameters of a scattering matrix of an optical device that ensures a consistent phase reference for all measurements to determine the scattering parameters of the matrix so that all measurable characteristics of the device can be calculated directly from the scattering parameters.

A method for determining scattering parameters of a scattering matrix of an optical device according to the present invention comprises applying an optical stimulus to a plurality of ports of the optical device. The optical stimulus is applied to the plurality of ports simultaneously. The optical fields emerging from the plurality of ports are then measured in amplitude and phase, and the scattering parameters are calculated using the measured emerging optical fields.

It has been discovered that by performing a series of measurements of the optical fields emerging from the ports of an optical device that includes measurements with ports of the optical device simultaneously stimulated, phase consistent measurements can be made to determine all four sub-matrices of a scattering matrix. Because the measurements are phase consistent, all measurable characteristics of the optical device can be calculated directly from the scattering parameters.

Furthermore, the invention provides embodiments with other features and advantages in addition to or in lieu of those discussed above. Many of these features and advantages are apparent from the description below with reference to the following drawings.

DETAILED DESCRIPTION OF THE EXEMPLARY EMBODIMENTS OF THE INVENTION

Figure 1:
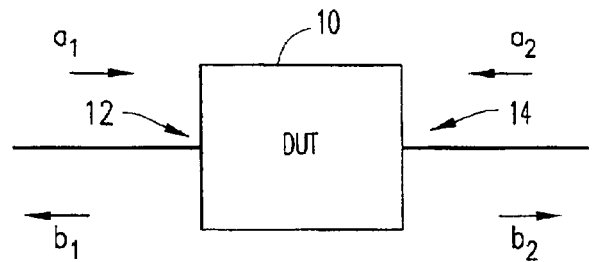
FIG. 1 is a block diagram that schematically illustrates the incident and emerging fields of an optical device under test (DUT) as represented by a polarization-independent scattering matrix to assist in explaining the present invention.
Figure 2:
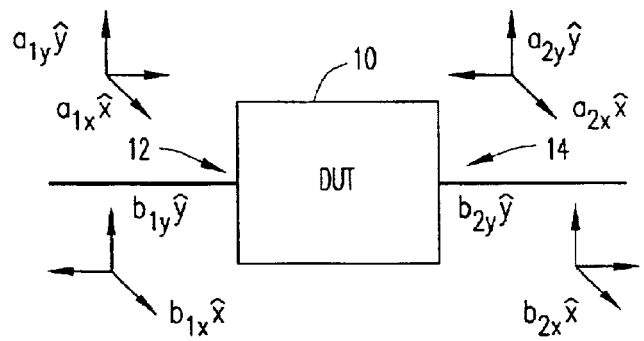
FIG. 2 is a block diagram that schematically illustrates the incident and emerging fields of an optical DUT as represented by a polarization-resolved scattering matrix to further assist in explaining the present invention.

A scattering matrix (S-Matrix) relates emerging fields to incident fields in an optical device, and can be understood with reference to FIGS. 1 and 2. In particular, FIGS. 1 and 2 are block diagrams that schematically illustrate two-port optical device under test (DUT) 10, and the incident and emerging fields at ports 12 and 14 thereof. In FIG. 1, optical fields $a_1$ and $a_2$ are incident on ports 12 and 14, respectively, and optical fields $b_1$ and $b_2$ emerge from ports 12 and 14, respectively. The incident and emerging fields are related to one another by the following scattering matrix:

$$\begin{bmatrix} b_1 \\ b_2 \end{bmatrix} = [S] \begin{bmatrix} a_1 \\ a_2 \end{bmatrix} \qquad (1)$$

where $$[S] = \begin{bmatrix} S_{11} & S_{12} \\ S_{21} & S_{22} \end{bmatrix}$$

A polarization-resolved scattering matrix relates the emerging fields to the incident fields, and takes into account the polarization of the fields. Thus, as shown in FIG. 2, the fields $a_1$, $a_2$, $b_1$ and $b_2$ are resolved into components in the x-direction and the y-direction to give a complete description of the polarization states of the fields.

The resolved incident and emerging fields illustrated in FIG. 2 are related to one another by the following general polarization-resolved scattering matrix:

$$\begin{bmatrix} \begin{pmatrix} b_{1x} \\ b_{1y} \end{pmatrix} \\ \begin{pmatrix} b_{2x} \\ b_{2y} \end{pmatrix} \end{bmatrix} = \begin{bmatrix} \begin{pmatrix} S_{11xx} & S_{11xy} \\ S_{11yx} & S_{11yy} \end{pmatrix} & \begin{pmatrix} S_{12xx} & S_{12xy} \\ S_{12yx} & S_{12yy} \end{pmatrix} \\ \begin{pmatrix} S_{21xx} & S_{21xy} \\ S_{21yx} & S_{21yy} \end{pmatrix} & \begin{pmatrix} S_{22xx} & S_{22xy} \\ S_{22yx} & S_{22yy} \end{pmatrix} \end{bmatrix} \begin{bmatrix} \begin{pmatrix} a_{1x} \\ a_{1y} \end{pmatrix} \\ \begin{pmatrix} a_{2x} \\ a_{2y} \end{pmatrix} \end{bmatrix} \qquad (2)$$

It is to be noted that this general polarization-resolved scattering matrix is made up of four 4×4 sub-matrices. Accordingly, equation (2) can also be written as follows:

$$\begin{bmatrix} b_{ix} \\ b_{iy} \end{bmatrix} = [S_{ij}] \begin{bmatrix} a_{jx} \\ a_{jy} \end{bmatrix} \quad i = 1, 2 \; j = 1, 2 \qquad (3)$$

where the sub-matrix $[S_{ij}]$ is given by $$[S_{ij}] = \begin{bmatrix} S_{ijxx} & S_{ijxy} \\ S_{ijyx} & S_{ijyy} \end{bmatrix}$$

The representation of equation (3) shows that the general polarization-resolved scattering matrix can be considered as a set of polarization-resolved sub-matrices. Each of these polarization-resolved sub-matrices represents a transmission characteristic or a reflection characteristic of DUT 10.

Equation (2) can also be written in the following form:

$$\begin{bmatrix} b_{1p} \\ b_{2p} \end{bmatrix} = [S_{pq}] \begin{bmatrix} a_{1q} \\ a_{2q} \end{bmatrix} \quad p = x, y \; q = x, y \qquad (4)$$

where the sub-matrix $[S_{pq}]$ is given by $$[S_{pq}] = \begin{bmatrix} S_{11pq} & S_{12pq} \\ S_{21pq} & S_{22pq} \end{bmatrix}$$

In the representation of equation (4), each sub-matrix represents a particular polarization characteristic of DUT 10, and gives reflection and transmission information about the DUT.

Although equations (3) and (4) are both valid representations of the general polarization-resolved scattering matrix of equation (2), it is often more convenient to use equation (3) because in many measurement situations, the user may be interested in separating the transmission characteristics of the DUT from the reflection characteristics; and this is easier to achieve using equation (3). This disclosure, accordingly, concentrates primarily on the representation in equation (3); however, it should be understood that it is not intended to so restrict the invention.

Figure 3:
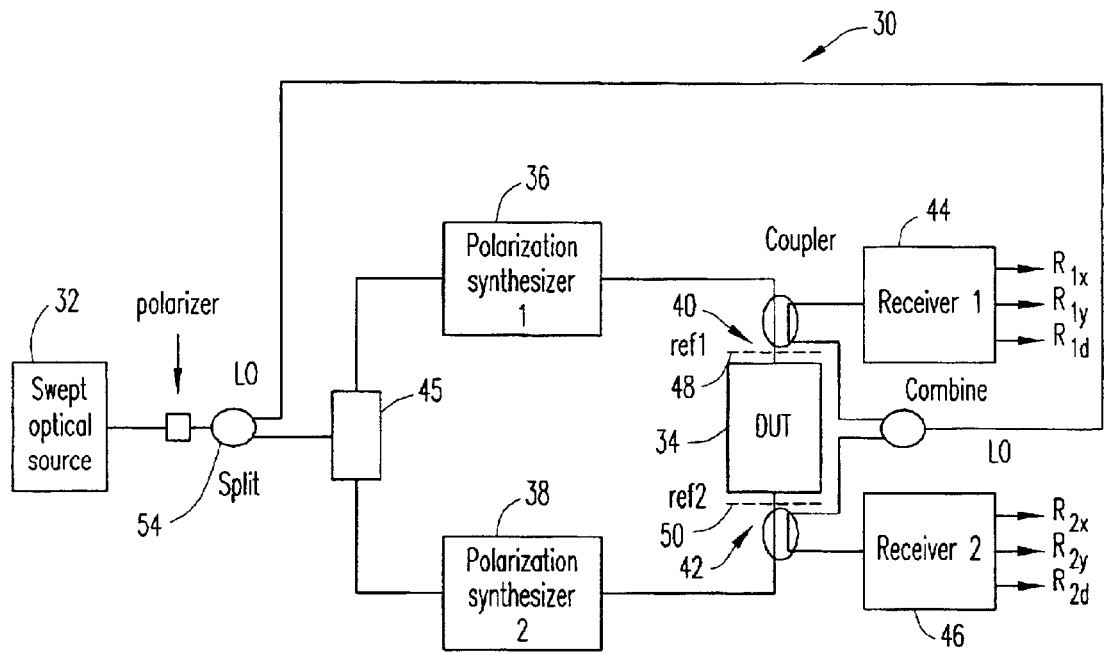
FIG. 3 is a block diagram that schematically illustrates a polarization-resolved S-Matrix test set to further assist in explaining the invention.

In order to determine the polarization-resolved scattering matrix of an optical DUT, it is necessary to place the DUT in a polarization-resolving test set. The test set applies optical stimulus signals to the DUT and measures the outputs from the DUT in amplitude and phase. FIG. 3 is a block diagram that schematically illustrates a polarization-resolved S-Matrix test set to assist in explaining the present invention.

As shown in FIG. 3, the test set, generally designated by reference number 30, includes swept optical source 32 that provides stimulus signals to DUT 34 through polarization synthesizers 36 and 38. Polarization synthesizers 36 and 38 control the state of polarization of the stimulus signals applied to input port 40 and output port 42, respectively, of the DUT. Emerging optical fields from ports 40 and 42 of DUT 34 are measured using receivers 44 and 46, respectively. The receivers are polarization sensitive and each receiver has three outputs. One of the outputs from each receiver ($R_{1x}$ or $R_{2x}$) represents the component of the emerging field in the x-direction, a second output from each receiver ($R_{1y}$ or $R_{2y}$) represents the component of the emerging field in the y-direction, and a third output from each receiver ($R_{1d}$ or $R_{2d}$) represents a polarization diversity output. Optical switch 45 is operable to determine which of ports 40 or 42 of the DUT 34 receives the stimulus signal.

FIG. 3 also illustrates reference planes 48 and 50 at input and output ports 40 and 42, respectively, of the DUT. As is known to those skilled in the art, the polarization-resolved scattering matrix is determined at these reference planes.

Existing techniques for determining the scattering parameters (S-Parameters) of optical devices are not completely phase-consistent. This means that the phase reference for some of the scattering parameters is different from the phase reference for other scattering parameters. As a result, not all device characteristics can be calculated directly from the scattering parameters. In particular, in conventional procedures for determining a polarization-resolved scattering matrix, one of the four 4×4 sub-matrices is determined at a time. To determine a sub-matrix, the DUT is stimulated at one port at a time, and the outputs of receivers 44 and 46 are used to determine the elements of the 4×4 sub-matrix. To determine all four elements of each 4×4 sub-matrix, it is necessary to set the polarization synthesizer, at the stimulated port, to at least two different polarization states.

Each scattering parameter is a complex number (with both an amplitude and a phase). The receivers measure the amplitude and phase relative to the amplitude and phase of local LO (see FIG. 3). At optical frequencies, however, the phase of the optical field is a very strong function of the exact location of the measurement reference plane. For example, a shift in the reference plane of only one optical wavelength will change the phase shift by 360 degrees. Also, as shown in FIG. 3, the output of swept optical source 32 is split into a path to the receiver through the DUT, and a LO path by splitter 54. If there is any difference in the path length between swept optical source 32 and a receiver through the DUT compared with the path length through the LO path, the phase shift is a strong function of the optical frequency. If, for example, the difference in the path lengths is 100 cm, a change in the optical frequency of 3 GHz will change the phase shift by 360 degrees. This effect illustrates that for repeatable and consistent measurements, it is important that the optical frequency be highly repeatable.

In practical measurement systems, path lengths of 100 cm or more are common. At the same time, a phase shift (i. e., a phase uncertainty) of 360 degrees is unacceptable in a high-precision measurement instrument. Typically, one would seek an uncertainty of 0.1 degree or better. For a 0.1 degree uncertainty in phase measurements, the uncertainty in the frequency needs to be 1 MHz or less.

The requirements on optical frequency uncertainty create difficulties for the measurement of the four S-Parameters of a sub-matrix. The problem arises because the four S-Parameters are defined in terms of the same phase reference. If the swept optical source is swept through the measurement range once for each of the input polarization states, the repeatability of the swept source should be better than about 1 MHz between sweeps. Alternatively, if the optical source is stepped across the measurement range, the frequency of the source should remain fixed to within 1 MHz while the polarization synthesizer provides the two input polarization states to the DUT. Stepped frequency measurements reduce requirements on the repeatability of the source, however, stepped-frequency measurements are not practical in homodyne network analyzer systems wherein the optical source must be swept continuously.

Figure 4:
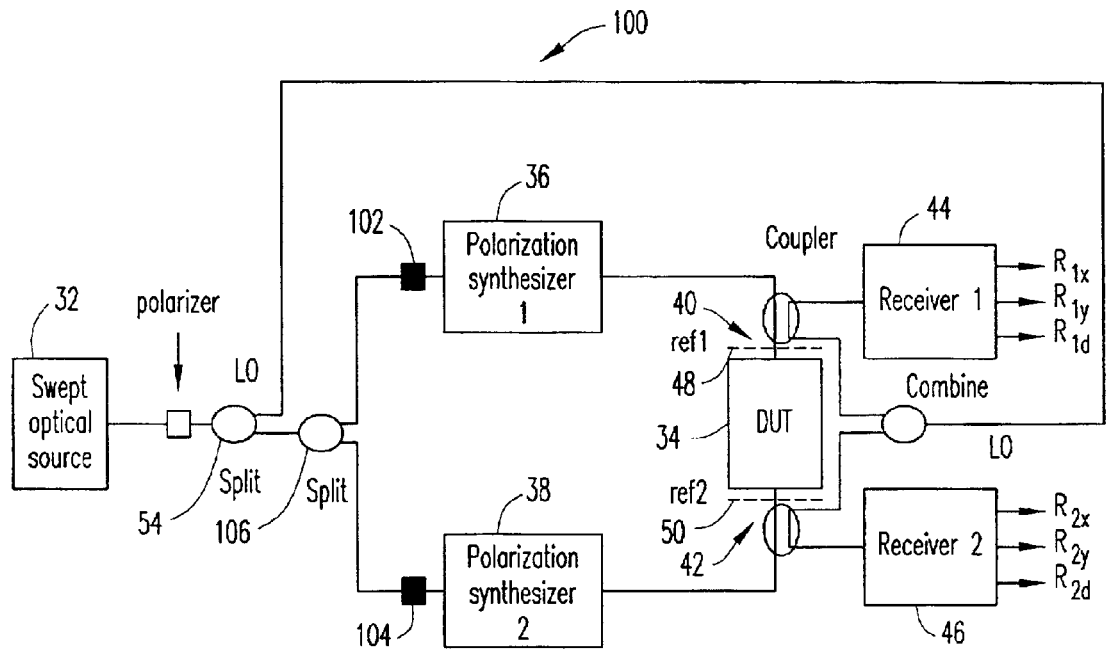
FIG. 4 is a block diagram that schematically illustrates a polarization-resolved S-Matrix test set according to an embodiment of the present invention.

FIG. 4 is a block diagram that schematically illustrates a polarization-resolved S-Matrix test set 100 according to an embodiment of the present invention. Test set 100 differs from test set 30 illustrated in FIG. 3 in that optical switch 45 in test set 30 has been replaced by optical gates 102 and 104, and splitter 106. In particular, splitter 106 receives the signal from swept optical source 32 via splitter 54, and directs the split signal to polarization synthesizers 36 and 38. Optical gates 102 and 104 are in the paths to polarization synthesizers 36 and 38, respectively.

Optical gates 102 and 104 enable either one of port 40 or port 42 of DUT 34 to be stimulated, as in the test set 30 of FIG. 3, by closing one or the other of gates 102 and 104. In addition, gates 102 and 104 enable both of ports 40 and 42 to be stimulated at the same time by simultaneously closing both gates.

Utilizing a test set such as test set 100 in FIG. 4, permits phase-consistent measurements to be made on all four sub-matrices of a polarization-resolved scattering matrix. In particular, the two sub-matrices $S_{11}$ and $S_{21}$ (see equation (1)) are determined in a phase-consistent manner with port 40 of the DUT stimulated, and sub-matrices $S_{12}$ and $S_{22}$ are determined in a similar manner with port 42 of the DUT stimulated. In addition, measurements are made with optical gates 102 and 104 both closed to stimulate both ports of the DUT at the same time so as to enable the phase references for all measurements to be tied together to ensure that the measurements are phase consistent. In particular, being able to stimulate both ports simultaneously permits the ratios of the receiver outputs to be calculated at each optical frequency. From the ratios, all entries in a sub-matrix can be calculated relative to a reference amplitude and phase. This permits the required repeatability of the frequency of the swept optical source in the test set to be greatly relaxed. The reason for this is that the relative phase shift between two polarization states is much less sensitive than the absolute phase shift to changes in the optical frequency (i.e., the state of polarization of light emerging from the DUT is much less sensitive to optical frequency than the absolute phase is sensitive to optical frequency).

According to an embodiment of the present invention, the polarization-resolved scattering matrix is determined using three different polarization states at each port of the DUT 44 in the test set 100 of FIG. 4. The approach is based on a technique first introduced by R. C. Jones, and the mathematics required to obtain a full-phase consistent polarization-resolved scattering matrix is described in detail below.

Stimulus Conditions

Consider the amplitude and polarization states of the stimulus signals from swept optical source 32. It is assumed that polarization synthesizers 36 and 38 in FIG. 4 can provide three different linear polarization states at reference planes 48 and 50 of ports 40 and 42, respectively, of DUT 34. The three states are defined in terms of their angle to the x axis. The three states provided by a polarization synthesizer j at a port j of a DUT are given by angles to the x axis of $$\phi_{jk_j}$$

where j=1, 2, and $k_j$=1, 3 is an index indicating the state of polarization at port j. If the amplitude of the stimulus field is normalized to unity in all three cases, the vector representing the stimulus to the DUT at port j is $$\begin{bmatrix} a_{jx} \\ a_{jy} \end{bmatrix} = \begin{bmatrix} \cos\phi_{jk_j} \\ \sin\phi_{jk_j} \end{bmatrix} \quad j=1, 2 \quad k_j = 1, 3 \qquad (5)$$

In general, the test set will contain imperfect components, and the amplitude and phase of the stimulus at each port will be a function of frequency and a function of the state of polarization. Therefore, it is necessary to generalize equation (5) to include an amplitude and a phase factor at each port.

Thus, equation (5) becomes $$\begin{bmatrix} a_{jx} \\ a_{jy} \end{bmatrix} = A_{jk_j} \begin{bmatrix} \cos\phi_{jk_j} \\ \sin\phi_{jk_j} \end{bmatrix} \quad j=1, 2 \quad k_j = 1, 3 \qquad (6)$$

where $$A_{jk_j} = |A_{jk_j}| e^{i a_{jk_j}}$$

is a complex scaling factor at port j for polarization state $k_j$ with amplitude $|A_{jk_j}|$ and phase $a_{jki}$ and $i=\sqrt{-1}$. Note that both the amplitude and the phase of $A_{jk_j}$ are functions of the optical frequency of the stimulus signal.

For simplicity, linear polarization at port j is assumed. However, in general, equations (5) and (6) and all of the results described hereinafter can be generalized to include elliptical polarization by replacing the $\phi_{jk_j}$ term in equations (5) and (6) by $e^{i\theta} \sin \phi$ where $\theta$ is an angle that determines the ellipticity of the polarization state.

Note that the vector $$\begin{bmatrix} a_{jx} \\ a_{jy} \end{bmatrix}$$

is commonly referred to as a Jones vector, and $a_{jx}$ and $a_{jy}$ are referred to as Jones parameters.

Receiver Outputs

The receiver outputs provide a measure of the x and y polarization components of the DUT outputs at the input and output reference planes. It is assumed that the test set has been calibrated so that the outputs of both receivers directly measure the emerging optical fields at device reference planes 48 and 50. Thus, the receiver outputs $R_{ix}$ and $R_{iy}$ at port i are given by $$\begin{bmatrix} R_{ix} \\ R_{iy} \end{bmatrix} = \begin{bmatrix} b_{ix} \\ b_{iy} \end{bmatrix} \quad i=1, 2 \qquad (7)$$

Measurement Conditions

Measurements are made with input optical stimulus signals applied to either one or both ports of the DUT. The measurements are repeated for each of the three polarization states ($k_j$=1,3) at each port.

When a single reflection or transmission sub-matrix of the polarization-resolved scattering matrix is to be measured, only port 40 or port 42 of the DUT is stimulated, i.e., j=1 or j=2. For some combinations of sub-matrices, stimulation of the device is required first at port 40 at then at port 42, i.e. j=1, 2.

A fully consistent two-port characterization of the polarization-resolved scattering matrix, including consistent optical phase information, requires a series of measurements with both ports of the DUT stimulated simultaneously. To generalize the analysis to include the situation where both ports are stimulated, a new index, m is introduced. When port 40 of the DUT is stimulated, m=j=1. When port 42 of the DUT is stimulated, m=j=2. When both ports of the DUT are stimulated simultaneously, m=3.

At each of the two ports of the DUT there are three possible polarization states. Thus, there are 6 different stimulus conditions when the DUT is stimulated at one port at a time, i.e., three conditions at port 40 and three conditions at port 42. In addition, when both ports are stimulated simultaneously, there is a total of 9 (i.e. 3×3) different combinations of stimuli.

The test set in FIG. 4 uses two receivers 44 and 46 to measure the emerging optical fields at both ports of the DUT. The outputs of each receiver are three complex numbers ($R_x$, $R_y$, and $R_d$), at each optical frequency. As shown below, at most, two of these output are used at any one time. Measurement of two outputs from the two receivers involves obtaining four complex numbers for every combination of input signals and input polarizations and at every optical frequency.

The matrix equations relating the inputs and outputs of the DUT for each of the stimulus conditions are set out below (note that j is the stimulation port and i is the measurement port).

(a) Only One Port of the DUT Stimulated.

The outputs of the receiver when only one of the input ports of the DUT is stimulated is obtained from equations (3), (6) and (7) for each of the three input polarization states:

(Polarization state 1)
$$\begin{bmatrix} R_{ij1x} \\ R_{ij1y} \end{bmatrix} = \begin{bmatrix} S_{ijxx} & S_{ijxy} \\ S_{ijyx} & S_{ijyy} \end{bmatrix} \begin{bmatrix} \cos\phi_{j1} \\ \sin\phi_{j1} \end{bmatrix} A_{j1} \quad i=1,2 \ j=m=1,2$$

(Polarization state 2)
$$\begin{bmatrix} R_{ij2x} \\ R_{ij2y} \end{bmatrix} = \begin{bmatrix} S_{ijxx} & S_{ijxy} \\ S_{ijyx} & S_{ijyy} \end{bmatrix} \begin{bmatrix} \cos\phi_{j2} \\ \sin\phi_{j2} \end{bmatrix} A_{j2} \quad i=1,2 \ j=m=1,2$$

(Polarization state 3)
$$\begin{bmatrix} R_{ij3x} \\ R_{ij3y} \end{bmatrix} = \begin{bmatrix} S_{ijxx} & S_{ijxy} \\ S_{ijyx} & S_{ijyy} \end{bmatrix} \begin{bmatrix} \cos\phi_{j3} \\ \sin\phi_{j3} \end{bmatrix} A_{j3} \quad i=1,2 \ j=m=1,2$$

Note that in these equations, the notation for the receiver outputs have been generalized to include four indices. The first index i represents the receiver where the measurement is made, the second index j represents the port where the stimulus is applied for that particular measurement, the third index represents the polarization state at the input for that particular measurement, and the fourth index represents the receiver output. For example, $R_{123x}$ is the x-polarized component of the output of Receiver 1 for a stimulus with polarization state 3 at port 2.

For compactness, the three above equations are rewritten as follows:

$$\begin{bmatrix} R_{imk_jx} \\ R_{imk_jy} \end{bmatrix} = \begin{bmatrix} S_{ijxx} & S_{ijxy} \\ S_{ijyx} & S_{ijyy} \end{bmatrix} \begin{bmatrix} \cos\phi_{jk_j} \\ \sin\phi_{jk_j} \end{bmatrix} A_{jk_j} \quad (8)$$

$$i=1,2 \ j=m=1,2 \ k_j=1,3$$

(b) Both Ports of the DUT Stimulated Simultaneously

Under the condition that the DUT is stimulated at both ports simultaneously, m=3. Because both ports of the DUT are stimulated simultaneously from the same optical source, the optical frequency of the stimulus applied to both ports is the same. Under such conditions, and assuming linear superposition, the output for two simultaneous stimuli can be obtained by simply adding the outputs that would be obtained for each of the two stimuli acting separately:

$$\begin{bmatrix} R_{i3k_1k_2x} \\ R_{i3k_1k_2y} \end{bmatrix} = \begin{bmatrix} R_{i1k_1x} \\ R_{i1k_1y} \end{bmatrix} + \begin{bmatrix} R_{i2k_2x} \\ R_{i2k_2y} \end{bmatrix} \quad i=1,2 \ k_1,k_2=1,3 \quad (9)$$

Note that in this equation the receiver outputs on the left of the equation have five indices. The first index i represents the port where the measurement is made. The second index (m, with a value of 3 in this case) represents the port(s) where the stimulus is applied. The index has a value of 3 to indicate that both ports are stimulated simultaneously. The third and fourth indices, $k_1$ and $k_2$, represents the polarization states at ports 1 and 2, respectively, and the fifth index represents the receiver output.

Summing over all possible combinations of polarization states of the stimuli at both input ports (a total of 9), and over both measurement ports, there is a total of 36 different receiver outputs.

From equations (8) and (9), the matrix equation for the receiver output can be written as:

$$\begin{bmatrix} R_{i3k_1k_2x} \\ R_{i3k_1k_2y} \end{bmatrix} = \begin{bmatrix} S_{i1xx} & S_{i1xy} \\ S_{i1yx} & S_{i1yy} \end{bmatrix} \begin{bmatrix} \cos\phi_{1k_1} \\ \sin\phi_{1k_1} \end{bmatrix} A_{1k_1} + \begin{bmatrix} S_{i2xx} & S_{i2xy} \\ S_{i2,yx} & S_{i2yy} \end{bmatrix} \begin{bmatrix} \cos\phi_{2k_2} \\ \sin\phi_{2k_2} \end{bmatrix} A_{2k_2} \quad (10)$$

$$i=1,2 \ k_1,k_2=1,3$$

or in a more compact form as:

$$\begin{bmatrix} R_{i3k_1k_2x} \\ R_{i3k_1k_2y} \end{bmatrix} = \sum_{j=1,2} \begin{bmatrix} S_{ijxx} & S_{ijxy} \\ S_{ijyx} & S_{ijyy} \end{bmatrix} \begin{bmatrix} \cos\phi_{jk_j} \\ \sin\phi_{jk_j} \end{bmatrix} A_{jk_j} \quad i=1,2 \ k_1,k_1=1,3 \quad (11)$$

Ratios of Measured Outputs

Ratios of measured Jones parameters outputs from the test-receivers are now defined. These are ratios of complex numbers and are themselves complex.

(a) One Port of the DUT Stimulated.

A set of ratios for measurements with only one port of the DUT stimulated at a time is first defined. These ratios, C1, are the ratios of the x-polarization output of each receiver to the y-polarization output from the same receiver. Thus, from equation (8), C1 becomes:

$$C1_{ijk_j} = \frac{R_{ijk_jx}}{R_{ijk_jy}} = \frac{S_{ijxx}\cos\phi_{jk_j} + S_{ijxy}\sin\phi_{jk_j}}{S_{ijyx}\cos\phi_{jk_j} + S_{ijyy}\sin\phi_{jk_j}} \quad i,j=1,2 \ k_1,k_2=1,3 \quad (12)$$

There are 12 C1-parameters. Of these 12 parameters, 6 are associated with each receiver. For each receiver there is a C1 parameter for each of the 3 polarization states of each of the 2 input ports to the DUT.

(b) Both Ports of the DUT Simultaneously Stimulated.

The C1-parameters are now generalized to the situation where both ports of the DUT are stimulated simultaneously (i.e. where m=3). When both ports are stimulated the C1 parameters are replaced by C2 parameters. Using equation (11), C2 becomes $$C2_{ik_1k_2} = \frac{R_{i3k_1k_2x}}{R_{i3k_1k_2y}} = \frac{\sum_{j=1,2} A_{jk_j}(S_{ijxx}\cos\phi_{jk_j} + S_{ijxy}\sin\phi_{jk_j})}{\sum_{j=1,2} A_{jk_j}(S_{ijyx}\cos\phi_{jk_j} + S_{ijyy}\sin\phi_{jk_j})} \quad (13)$$

$$i=1,2 \ k_1,k_2=1,3$$

There are 18 possible C2-parameters because there are 2 receivers and 9 possible combinations of input polarizations.

Definitions of Matrices

A number of matrices, M, related to the measurements with three different input polarization states at each of the two ports are now defined. There are four M matrices—one associated with each of the four scattering sub-matrices in equation (3).

The M matrix associated with sub-matrix $[S_{ij}]$ is defined as follows:

$$[M_{ij}] = \begin{bmatrix} \cos\phi_{j1} & \sin\phi_{j,1} & -C1_{ij1}\cos\phi_{j,1} & -C1_{ij1}\sin\phi_{j1} \\ \cos\phi_{j2} & \sin\phi_{j,2} & -C1_{ij2}\cos\phi_{j,2} & -C1_{ij2}\sin\phi_{j2} \\ \cos\phi_{j3} & \sin\phi_{j,3} & -C1_{ij3}\cos\phi_{j,3} & -C1_{ij3}\sin\phi_{j3} \end{bmatrix} \quad (14)$$

Matrix Equations to Determine Elements of Polarization-Resolved Scattering Matrix

A series of matrix equations are now developed that are used to determine the elements of the polarization-resolved S-Matrix from the known input polarization states and the measured receiver outputs. Initially, consider the relatively straightforward case where the DUT is stimulated at one port only and a single reflection or a single transmission parameter is to be measured. Following this, more general cases are considered.

(a) Determination of a Single Polarization-Resolved Sub-Matrix

The sub-matrix $[S_{ij}]$ to be determined is given by:

$$[S_{ij}] = \begin{bmatrix} S_{ijxx} & S_{ijxy} \\ S_{ijyx} & S_{ijyy} \end{bmatrix} \quad (15)$$

where i=1 or 2 and j=1 or 2. For this determination, only one port of the DUT is stimulated, and only one receiver in the test set is used. The DUT is stimulated at port j with three different polarization states $k_j=1,3$, and the outputs of the receiver at port i are used to determine the element of the sub-matrix. There are four steps in the determination process.

In the first three steps, receiver outputs are recorded for each of the three polarization states of the stimulus. For each of these three polarization states, the ratios of the measured Jones parameter outputs of the receiver are calculated. The ratios are the parameters. $C1_{ijkj}$ in equation (12). By taking the ratio of the two Jones parameter outputs from each receiver, the absolute phase of the receiver outputs is not required.

The fourth step uses one output from the receiver for one of the three polarization states $k_j$. This is a critical measurement because it requires the absolute phase of the receiver output. It serves as the reference for absolute phase in the overall measured sub-matrix.

The matrix equation that enables the element of the sub-matrix $[S_{ij}]$ to be determined from the four steps outlined above is now set forth. The starting point for this is equation (12). Equation (12) can be re-written as:

$$S_{ijxx}\cos\phi_{jkj}+S_{ijxy}\sin\phi_{jkj}-C1_{ijkj}S_{ijyx}\cos\phi_{jkj}-C1_{ijkj}S_{ijyy}\sin\phi_{jkj}=0$$
$$k_j=1,3 \quad (16)$$

or as $$\left.\begin{array}{l}S_{ijxx}\cos\phi_{j1} + S_{ijxy}\sin\phi_{j1} - C1_{ij1}S_{ijyx}\cos\phi_{j1} - C1_{ij1}S_{ijyy}\sin\phi_{j1} = 0 \\ \text{and} \\ S_{ijxx}\cos\phi_{j2} + S_{ijxy}\sin\phi_{j2} - C1_{ij2}S_{ijyx}\cos\phi_{j2} - C1_{ij2}S_{ijyy}\sin\phi_{j2} = 0 \\ \text{and} \\ S_{ijxx}\cos\phi_{j3} + S_{ijxy}\sin\phi_{j3} - C1_{ij3}S_{ijyx}\cos\phi_{j3} - C1_{ij3}S_{ijyy}\sin\phi_{j3} = 0 \end{array}\right\} \quad (17)$$

Equation (17) encapsulates the first three steps of the measurement procedure.

In the fourth step, one output from the receiver is recorded for one of the three polarization states $k_j$ for this measurement is arbitrary. From equation (8), the two receiver outputs are $$R_{ijk_jx}=b_{imk_jx}=A_{jk_j}(S_{ijxx}\cos\phi_{jk_j}+S_{ijxy}\sin\phi_{jk_j}) \quad (18)$$

and $$R_{ijk_jy}=b_{imk_jy}=A_{jk_j}(S_{ijxx}\cos\phi_{jk_j}+S_{ijyy}\sin\phi_{jk_j}) \quad (19)$$

It is necessary to use only one of these two outputs because once an output is selected, the other output becomes redundant. The x-polarization state is arbitrarily selected, as given by equation (18).

Combining equations (17) and (18), the following is obtained:

$$\begin{bmatrix} 0 \\ 0 \\ 0 \\ R_{ijk_jx} \end{bmatrix} = \begin{bmatrix} [M_{ij}] \\ [T_j] \end{bmatrix} \begin{bmatrix} S_{ijxx} \\ S_{ijxy} \\ S_{ijyx} \\ S_{ijyy} \end{bmatrix} \quad (20)$$

where $$[T_j]=A_{jk_j}[\cos\phi_{jk_j} \ \sin\phi_{jk_j} \ 0 \ 0]$$

Alternatively, if the y-polarization receiver output is selected rather than the x-polarization receiver output, equations (17) and (19) are combined to give:

$$\begin{bmatrix} 0 \\ 0 \\ 0 \\ R_{ijk_jy} \end{bmatrix} = \begin{bmatrix} [M_{ij}] \\ [U_j] \end{bmatrix} \begin{bmatrix} S_{ijxx} \\ S_{ijxy} \\ S_{ijyx} \\ S_{ijyy} \end{bmatrix} \quad (21)$$

where $$[U_j]=A_{jk_j}[0 \ 0 \ \cos\phi_{jk_j} \ \sin\phi_{jk_j}]$$

Equations (20) and (21) are equivalent and will give precisely the same results. A third approach to finding a matrix equation for the elements of the sub-matrix is now provided. This third approach uses both the x-polarization receiver output and the y-polarization receiver output. These two receiver outputs are obtained at one of the three input polarization states $k_j$. The choice of this polarization state is arbitrary and is assigned the third polarization state ($k_j=3$).

Under these conditions, equations (17), (18) and (19) can be rewritten as:

$$\left.\begin{array}{l} S_{ijxx}\cos\phi_{j1} + S_{ijxy}\sin\phi_{j1} - C1_{ij1}S_{ijyx}\cos\phi_{j1} - C1_{ij1}S_{ijyy}\sin\phi_{j1} = 0 \\ S_{ijxx}\cos\phi_{j2} + S_{ijxy}\sin\phi_{j2} - C1_{ij2}S_{ijyx}\cos\phi_{j2} - C1_{ij2}S_{ijyy}\sin\phi_{j2} = 0 \\ R_{ij3x} = A_{jk_j}S_{ijxx}\cos\phi_{j3} + A_{jk_j}S_{ijxy}\sin\phi_{j3} \\ R_{ij3y} = A_{jk_j}S_{ijyx}\cos\phi_{j3} + A_{jk_j}S_{ijyy}\sin\phi_{j3} \end{array}\right\} \quad (22)$$

It is to be noted that equation (22) does not explicitly include the third line of equation (17). This is because all information in the third line of equation (17) is included in the third and fourth lines of equation (22), and is, therefore, redundant. Equation (22) can be re-written as:

$$\begin{bmatrix} 0 \\ 0 \\ R_{ij3x} \\ R_{ij3y} \end{bmatrix} = [N_{ij}] \begin{bmatrix} S_{1jxx} \\ S_{1jxy} \\ S_{1jyx} \\ S_{1jyy} \end{bmatrix} \quad (23)$$

-continued where $$[N_{ij}] = \begin{bmatrix} \cos\phi_{j1} & \sin\phi_{j1} & -Cl_{ij1}\cos\phi_{j1} & -Cl_{ij1}\sin\phi_{j1} \\ \cos\phi_{j2} & \sin\phi_{j2} & -Cl_{ij2}\cos\phi_{j2} & -Cl_{ij2}\sin\phi_{j2} \\ A_{jk_j}\cos\phi_{j3} & A_{jk_j}\sin\phi_{j3} & 0 & 0 \\ 0 & 0 & A_{jk_j}\cos\phi_{j3} & A_{jk_j}\sin\phi_{j3} \end{bmatrix} \quad (24)$$

or $$[N_{ij}] = \begin{bmatrix} \cos\phi_{j1} & \sin\phi_{j1} & -Cl_{ij1}\cos\phi_{j1} & -Cl_{ij1}\sin\phi_{j1} \\ \cos\phi_{j2} & \sin\phi_{j2} & -Cl_{ij2}\cos\phi_{j2} & -Cl_{ij2}\sin\phi_{j2} \\ & & [T_3] & \\ & & [U_3] & \end{bmatrix}$$

where [T] and [U] are as given in equations (20) and (21), respectively.

Equation (23) is equivalent to equations (20) and (21) and will give precisely the same result. In general, equation (23) may be more convenient to use than equations (20) or (21) because of its symmetry with respect to the receiver outputs.

Equations (20), (21), and (23) can all be written in the form $$[R]=[V][A]$$

or $$[A]=[V]^{-1}[R] \quad (25)$$

where [R] is a 1×4 vector containing the receiver outputs, [V] is a 4×4 square matrix containing an array of elements involving the ratios of outputs from the receivers and information about the polarization states used in the measurements, and [A] is a 1×4 vector containing the 4 (complex) polarization-resolved scattering parameters.

Thus, all elements of the (complex) 2×2 sub-matrix can be found by solving equation (25) i.e., by inverting a 4×4 matrix.

(b) Determination of a Single Polarization-Independent Sub-Matrix.

For some DUT's it may not be necessary to determine the full polarization-resolved scattering matrix. For example, the characteristics of some fiber devices such as gratings may be independent of polarization; and a full polarization-resolved measurement may not be needed. For such devices, it is necessary to stimulate the DUT with one polarization state only. Under such conditions, equations (20), (21) and (23) reduce to $$S_{ij} = \frac{R_{ijk_jd}}{A_{jk_j}} \quad (26)$$

where the subscript d represents the polarization diversity output from the receiver. For polarization-independent measurements to be useful, the polarization-diversity output $R_{ijk_jd}$ will generally need to be independent of the polarization state $k_j$ at the input.

(c) Simultaneous Determination of Two Polarization-Resolved Sub-Matrices

The case where two of the sub-matrices are determined simultaneously, with the stimulus applied to one of the two ports is now considered. Examples of this are simultaneous determination of the sub-matrix $S_{11}$ and the sub-matrix $S_{21}$ with the stimulus applied at port 40, or simultaneous determination of the sub-matrix $S_{22}$ and the sub-matrix $S_{12}$ with the stimulus applied at port 42.

A straightforward method to obtain two sub-matrices is to use the technique described previously wherein both receivers in the test set are used. Equation (20), (21) or (23) is applied, first using outputs from one of the receivers to obtain one of the sub-matrices. Equation (20), (21) or (23) is then applied again, using outputs from the other receiver to obtain the other sub-matrix. If this technique is used to obtain the two sub-matrices, the measured sub-matrices do not necessarily have a consistent phase reference.

To ensure a consistent phase reference, the reference measurements in equations (20), (21) and (23) at both receivers should be obtained with the same stimulus signal. In other words, these measurements need to be obtained for the same input polarization state and for the same sweep of the input optical source.

As an alternative to using two matrix calculations to obtain two sub-matrices, it is possible to obtain the parameters of two sub-matrices simultaneously, in a single matrix equation. The matrix equation for the elements of the two sub-matrices follows directly from equations (17), (18), and (19). In applying equations (17), (18), and (19), we recognize that because only one port is stimulated j is fixed throughout the measurement. The index i can have a value of 1 or 2, depending on whether it refers to the receiver at the input or output of the DUT.

Thus, equations (17), (18) and (19) can be written as:

$$\left.\begin{aligned}S_{ijxx}\cos\phi_{j1} + S_{ijxy}\sin\phi_{j1} - Cl_{ij1}S_{ijyx}\cos\phi_{j1} - Cl_{ij1}S_{ijyy}\sin\phi_{j1} &= 0 \\ S_{ijxx}\cos\phi_{j2} + S_{ijxy}\sin\phi_{j2} - Cl_{ij2}S_{ijyx}\cos\phi_{j2} - Cl_{ij2}S_{ijyy}\sin\phi_{j2} &= 0 \\ R_{ij3x} &= A_{jk_j}S_{ijxx}\cos\phi_{j3} + A_{jk_j}S_{ijxy}\sin\phi_{j3} \\ R_{ij3y} &= A_{jk_j}S_{ijyx}\cos\phi_{j3} + A_{jk_j}S_{ijyy}\sin\phi_{j3}\end{aligned}\right\} \quad (27)$$

where i=1, 2.

Equation (27) can be written as:

$$\begin{bmatrix} 0 \\ 0 \\ R_{1j3x} \\ R_{1j3y} \\ 0 \\ 0 \\ R_{2j3x} \\ R_{2j3x} \end{bmatrix} = \begin{bmatrix} [N_{1j}] & 0 \\ 0 & [N_{2j}] \end{bmatrix} \begin{bmatrix} S_{1jxx} \\ S_{1jxy} \\ S_{1jyx} \\ S_{1jyy} \\ S_{2jxx} \\ S_{2jxy} \\ S_{2jyx} \\ S_{2jyy} \end{bmatrix} \quad (28)$$

Note that equation (28) can be re-written in the form of equation (25) where [R] is a 1×8 vector containing the receiver outputs, [V] is a 8×8 square matrix containing an array of elements involving the ratios of outputs from the receivers and information about the polarization states used in the measurements, and [A] is a 1×8 vector containing the 4 (complex) polarization-resolved s-Parameters in the two sub-matrices.

Thus, all elements of the two (complex) 2×2 sub-matrix can be found by solving the matrix equation (25). This involves the inversion of an 8×8 matrix.

(d) Simultaneous Determination of Two Polarization-Independent Sub-Matrices

As pointed out above, for some DUT's it may not be necessary to determine the full polarization-resolved scattering matrices. Two polarization-independent sub-matrices can be found using only one input polarization state. For polarization-independent sub-matrices, equation (28) can simply be replaced by equation (24).

(e) Simultaneous Determination of Four Polarization-Resolved Sub-Matrices

The determination of all four sub-matrices in the polarization-resolved scattering matrix is now considered.

1. Simple method without consistent phase reference:

A simple method for obtaining all four sub-matrices method is based on the technique described above for obtaining two sub-matrices. In the method, the stimulus signal is first applied to one of the two ports of the DUT. Then equation (20), (21) or (23) is used twice to obtain two of the four sub-matrices. (Alternatively equation (28) can be used once to obtain the same two sub-matrices). Then, the stimulus is applied to the other port and the process is repeated to find the other two sub-matrices.

As explained above, a consistent phase reference can be established for each pair of sub-matrices. However, this approach cannot provide a consistent phase reference between all four sub-matrices.

2. Method providing consistent phase reference for all four sub-matrices:

If a consistent phase reference between all four sub-matrices is needed in a particular measurement, it is necessary to take a number of measurements on the DUT with both ports stimulated simultaneously. This most general measurement can be undertaken as follows.

To define a measurement technique that provides a consistent phase reference, it is necessary to decide how many measurements are to be made with both ports stimulated. In principle, it is possible to stimulate the device with 9 different combinations of polarization states (three on each port). All of these combinations, however, are not needed.

One approach to determine all four sub-matrices with a consistent phase reference is to use the above-described methods for obtaining two pairs of sub-matrices, and to adapt these methods to include a minimum number of measurements with both ports stimulated.

The key to obtaining a formulation that enables all four sub-matrices to be obtained is to ensure that all measurements are referred to one single set of reference measurements using both receivers, for one combination of input polarization states and for a single sweep of the optical source. It turns out that there are many possible combinations of measurements that can achieve this, and one is described below.

There are five steps in the method:

Step 1: Apply the optical stimulus to port 40 and sweep the optical source for three different polarization states. Record both polarization-resolved outputs from both receivers.

Step 2: Repeat the process with the optical stimulus applied at port 42. Again record both polarization-resolved outputs from both receivers.

Step 3: Using the receiver outputs, calculate the C1 parameters given in equation (12).

Step 4: Apply an optical stimulus to both ports simultaneously and sweep the optical source for one (possibly arbitrary) combination of the polarization state at the input port and one polarization state at the output port. Record both polarization-resolved outputs from both receivers.

Step 5: Using all data, solve for the full polarization-resolved S-Matrix.

The equations used in this method are as follows:

When the both ports of the DUT are simultaneously stimulated, the receiver outputs are, from equation (11):

$$R_{i3k_1k_2x} = b_{i3k_1k_2x} + \sum_{j=1,2} A_{jk_j}(S_{ijxx}\cos\phi_{jk_j} + S_{ijxy}\sin\phi_{jk_j}) \quad (29)$$

$$R_{i3k_1k_2y} = b_{i3k_1k_2y} + \sum_{j=1,2} A_{jk_j}(S_{ijyx}\cos\phi_{jk_j} + S_{ijyy}\sin\phi_{jk_j}) \quad (30)$$

The elements of the full polarization-resolved s-matrix are found by combining equations (17), (29) and (30):

$$\begin{bmatrix} 0 \\ 0 \\ 0 \\ 0 \\ 0 \\ 0 \\ 0 \\ 0 \\ 0 \\ 0 \\ 0 \\ 0 \\ R_{13k_1k_2x} \\ R_{13k_1k_2y} \\ R_{23k_1k_2x} \\ R_{23k_1k_2y} \end{bmatrix} = \begin{bmatrix} [M_{11}] & [0] & [0] & [0] \\ [0] & [M_{12}] & [0] & [0] \\ [0] & [0] & [M_{21}] & [0] \\ [0] & [0] & [0] & [M_{22}] \\ [G_1] & [G_2] & [G_3] & [G_4] \end{bmatrix} \begin{bmatrix} S_{11xx} \\ S_{11xy} \\ S_{11yx} \\ S_{11yy} \\ S_{12xx} \\ S_{12xy} \\ S_{12yx} \\ S_{12yy} \\ S_{21xx} \\ S_{21xy} \\ S_{21yx} \\ S_{21yy} \\ S_{22xx} \\ S_{22xy} \\ S_{22yx} \\ S_{22yy} \end{bmatrix} \quad (31)$$

where $$[G_1] = \begin{bmatrix} [T_1] \\ [U_1] \\ [0]_{1\times 4} \\ [0]_{1\times 4} \end{bmatrix} \quad [G_2] = \begin{bmatrix} [T_2] \\ [U_2] \\ [0]_{1\times 4} \\ [0]_{1\times 4} \end{bmatrix} \quad [G_3] = \begin{bmatrix} [0]_{1\times 4} \\ [0]_{1\times 4} \\ [T_1] \\ [U_1] \end{bmatrix} \quad [G_4] = \begin{bmatrix} [0]_{1\times 4} \\ [0]_{1\times 4} \\ [T_2] \\ [U_2] \end{bmatrix}$$

$[0]_{1\times 4}$ is a 1×4 null matrix, and [T] and [U] are as given in equations (20) and (21), respectively. Note that equation (31) can be re-written in the form of equation (25) where [R] is a 1×16 vector containing the receiver outputs, [V] is a 16×16 square matrix containing an array of elements involving the ratios of outputs from the receivers and information about the polarization states used in the measurements and [A] is a 1×6 vector containing the 4 (complex) polarization-resolved s-parameters in the two sub-matrices.

Thus, all elements of the full (complex) 4×4 polarization-resolved scattering matrix can be found by solving matrix equation (25). This involves the inversion of a 16×16 matrix.

Figure 5:
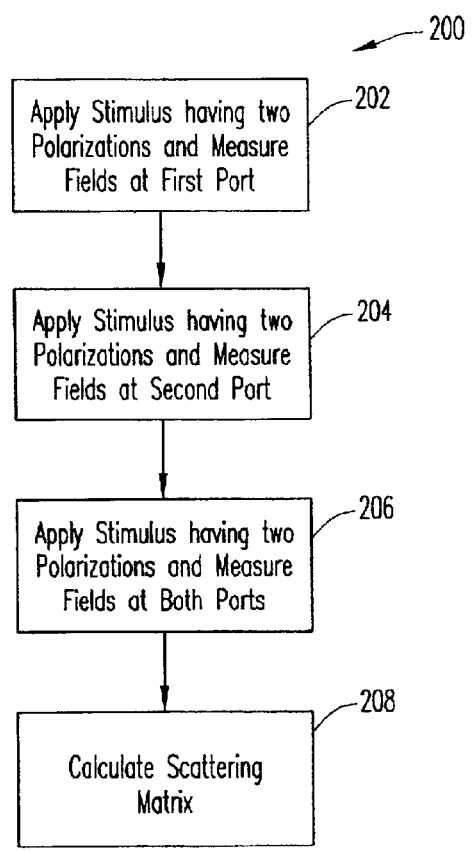
FIG. 5 is a flow chart that illustrates steps of a method for determining the polarization-resolved scattering matrix of an optical device according to another embodiment of the present invention.

FIG. 5 is a flow chart that illustrates steps of method 200 for determining the polarization-resolved scattering matrix of an optical device according to an embodiment of the present invention. As shown in FIG. 5, an optical stimulus with two polarizations is first applied to one of a pair of ports of the optical device, and the emerging optical field is measured in amplitude and phase (step 202). The optical stimulus is then applied to the second port of the pair of ports and the emerging optical field is measured in amplitude and phase (step 204). The optical stimulus is then applied to both ports simultaneously and the emerging optical fields measured in amplitude and phase (step 206). The polarization-resolved scattering matrix is then calculated from the emerging fields measured in steps 202, 204 and 206 (step 208). It should be recognized that steps 202–206 can be performed in any sequence and not only in the sequence shown in FIG. 5.

While what has been described constitutes exemplary embodiments of the present invention, it should be recognized that the invention can be varied in many respects without departing therefrom. Because the invention can be varied in many ways, it should be understood that the invention should be limited only insofar as is required by the scope of the following claims.

We claim:

1. A method for determining scattering parameters of a scattering matrix of an optical device, comprising:

applying an optical stimulus to a plurality of ports of the optical device;

measuring optical fields emerging from the plurality of ports in amplitude and phase, the applying step including applying the optical stimulus to the plurality of ports simultaneously; and calculating said scattering parameters using said measured optical fields;

said plurality of ports comprises first and second ports, and said measuring step comprises performing a first series of measurements while only said first port is stimulated by said optical stimulus, performing a second series of measurements while only said second port is stimulated by said optical stimulus, and performing a third series of measurements while said first and second ports are simultaneously stimulated by said optical stimulus; wherein said first series of measurements comprises a first series of phase-consistent measurements to determine a first two of four sub-matrices of said scattering matrix, said second series of measurements comprises a second series of phase-consistent measurements to determine a second two of said four sub-matrices of the scattering matrix, and said third series of measurements ensures that the first and second series of phase-consistent measurements are phase-consistent.

2. The method according to claim 1, wherein said scattering matrix comprises a polarization-resolved scattering matrix, and wherein said applying step comprises applying an optical stimulus having different polarization states to said plurality of ports.

3. The method according to claim 2, wherein said applying step comprises applying an optical stimulus of at least three polarization states to said plurality of ports.

4. The method according to claim 3, wherein said at least three polarization states comprises three linear polarization states.

5. The method according to claim 1, wherein said scattering matrix comprises a polarization-resolved scattering matrix, and wherein said applying step comprises applying an optical stimulus of at least three polarization states to said first and second ports.

6. A method for determining scattering parameters of a polarization-resolved scattering matrix of an optical device having first and second ports, comprising:

applying an optical stimulus to said first port and performing a first series of measurements of an optical field emerging from said first port;

applying an optical stimulus to said second port and performing a second series of measurements of an optical field emerging from said second port;

simultaneously applying an optical field to said first and second ports and performing a third series of measurements of optical fields emerging from said first and second ports; and calculating said scattering parameters using said first, second and third series of measurements; said applying steps comprise applying an optical stimulus of at least three polarization states; said first series of measurements comprises a first series of phase-consistent measurements to determine a first two of four sub-matrices of the polarization-resolved scattering matrix, said second series of measurements comprises a second series of phase-consistent measurements to determine a second two of said four sub-matrices of the polarization-resolved scattering matrix, and said third series of measurements ensures that the first and second series of phase-consistent measurements are phase-consistent.

7. The method according to claim 6, wherein said at least three polarization states comprise three linear polarization states.

8. The method according to claim 6, wherein said at least three polarization states comprise three elliptical polarization states.

9. An apparatus for determining scattering parameters of a scattering matrix of an optical device, comprising:

an optical source for providing stimulus signals to first and second ports of said optical device;

receivers for measuring optical fields emerging from said first and second ports of said optical device; and optical switching means between said optical source and said optical device for selectively providing stimulus signals to only said first port, only said second port, and simultaneously to both said first and second ports; said receivers provide a first series of measurements while only said first port is stimulated by said stimulus signals, a second series of measurements while only said second port is stimulated by said stimulus signals, and a third series of measurements while said first and second ports are simultaneously stimulated by said stimulus signals; said first series of measurements comprises a first series of phase-consistent measurements to determine a first two of four sub-matrices of said scattering matrix, said second series of measurements comprises a second series of phase-consistent measurements to determine a second two of said four sub-matrices of the scattering matrix, and said third series of measurements ensures that the first and second series of phase-consistent measurements are phase-consistent.

10. The apparatus according to claim 9, wherein said optical switching means includes a first optical switch in a first path from said optical source to said first port, and a second optical switch in a second path from said optical source to said second port.

11. The apparatus according to claim 9, wherein said apparatus determines scattering parameters of a polarization-resolved scattering matrix of said optical device, and wherein said apparatus further includes first and second polarization synthesizers in said first and second paths for providing optical stimulus signals having different polarization states to said first and second ports.

12. The apparatus according to claim 11, wherein said first and second polarization synthesizers provide optical stimulus signals having at least three polarization states to said first and second ports.

13. The apparatus according to claim 12, wherein said first and second polarization synthesizers provide optical stimulus signals having three linear polarization states to said first and second ports.

14. The apparatus according to claim 11, wherein a first and second reference planes are associated with said first and second ports, respectively, and wherein said scattering parameters of said polarization-resolved scattering matrix are determined using said measurements with reference to said first and second reference planes.

* * * * *

UNITED STATES PATENT AND TRADEMARK OFFICE
CERTIFICATE OF CORRECTION

PATENT NO. : 6,940,594 B2
DATED : September 6, 2005
INVENTOR(S) : Tucker et al.

It is certified that error appears in the above-identified patent and that said Letters Patent is hereby corrected as shown below:

<u>Title page,</u>
Item [56], References Cited, OTHER PUBLICATIONS,
"Walker, N.C." reference, delete "Juction" and insert -- Junction --.

Signed and Sealed this

Tenth Day of January, 2006

JON W. DUDAS
*Director of the United States Patent and Trademark Office*